United States Patent
Van Der Kooi et al.

(10) Patent No.: US 12,496,593 B2
(45) Date of Patent: Dec. 16, 2025

(54) VORTEX FINDER FOR A CYCLONIC SEPARATOR

(71) Applicant: KONINKLIJKE PHILIPS N.V., Eindhoven (NL)

(72) Inventors: Johannes Tseard Van Der Kooi, Eindhoven (NL); Emiel Koopmans, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 17/791,894

(22) PCT Filed: Dec. 29, 2020

(86) PCT No.: PCT/EP2020/087944
§ 371 (c)(1),
(2) Date: Jul. 9, 2022

(87) PCT Pub. No.: WO2021/140041
PCT Pub. Date: Jul. 15, 2021

(65) Prior Publication Data
US 2023/0044023 A1 Feb. 9, 2023

(30) Foreign Application Priority Data
Jan. 9, 2020 (EP) ..................................... 20150969

(51) Int. Cl.
*B04C 5/13* (2006.01)
*A47L 9/16* (2006.01)

(52) U.S. Cl.
CPC ................. *B04C 5/13* (2013.01); *A47L 9/16* (2013.01); *B04C 2005/136* (2013.01)

(58) Field of Classification Search
CPC ....... B04C 5/13; B04C 2005/136; A47L 9/16; A47L 9/1658
See application file for complete search history.

(56) References Cited

U.S. PATENT DOCUMENTS 3,693,791 A * 9/1972 Beck .......................... B04C 1/00
                                                          209/710
4,260,401 A * 4/1981 Truhan ...................... B04C 5/13
                                                          55/459.3

(Continued)

FOREIGN PATENT DOCUMENTS

| | | |
|---|---|---|
| CN | 107581973 A | 1/2018 |
| EP | 2044996 A1 | 4/2009 |

(Continued)

*Primary Examiner* — Dung H Bui
(74) *Attorney, Agent, or Firm* — Maschoff Brennan

(57) ABSTRACT

The invention describes a vortex finder for a cyclonic separator. The vortex finder includes a plurality of stationary vanes around which incoming air is guided into the vortex finder, in which a side of the vanes facing the incoming air is provided with a protrusion at a stagnation point. The protrusion is shaped so as to guide the incoming air into the vortex finder, and have a concave side following a shape of a neighboring vane, and a rounded top. Further, the protrusion has a height in a range between 70% and 130%, and in a range between 85% and 115% of a gap width between the vanes. The gap width between adjacent vanes increases from an outside to an inside of the vortex finder. A vacuum cleaner that includes a cyclonic separator has such a vortex finder.

9 Claims, 3 Drawing Sheets

(56) References Cited

U.S. PATENT DOCUMENTS

| | | | | |
|---|---|---|---|---|
| 4,420,314 | A * | 12/1983 | Barron, Jr. | B04C 5/06 55/436 |
| 5,180,257 | A * | 1/1993 | Narishima | B04C 5/13 406/173 |
| 6,666,338 | B1 * | 12/2003 | Henriksson | B04C 3/06 209/208 |
| 6,679,930 | B1 * | 1/2004 | An | B04C 7/00 55/459.1 |
| 6,857,165 | B2 * | 2/2005 | Oh | A47L 9/1666 55/459.4 |
| 7,771,162 | B2 * | 8/2010 | Castan | F01D 17/165 415/164 |
| 9,393,510 | B2 * | 7/2016 | MacDonald | B01D 45/08 |
| 10,016,768 | B2 | 7/2018 | Van Wolferen et al. | |
| 2004/0068826 | A1 * | 4/2004 | Howie | A47L 9/188 15/353 |
| 2006/0037294 | A1 | 2/2006 | Oh et al. | |
| 2006/0043130 | A1 * | 3/2006 | Dabrowski | B60R 9/055 224/328 |
| 2007/0079579 | A1 * | 4/2007 | Eddington | B04C 5/13 55/337 |
| 2009/0007370 | A1 * | 1/2009 | Gomiciaga-Pereda | B01D 45/06 15/353 |
| 2009/0133370 | A1 * | 5/2009 | Yoo | A47L 9/1666 55/455 |
| 2009/0300871 | A1 * | 12/2009 | Seo | B04C 5/04 55/346 |
| 2010/0019095 | A1 * | 1/2010 | Grohmann | B64C 7/00 244/210 |
| 2010/0126057 | A1 * | 5/2010 | Safwat | A01K 73/045 43/9.7 |
| 2012/0167336 | A1 * | 7/2012 | Tran | A47L 9/122 15/347 |
| 2016/0123227 | A1 * | 5/2016 | Murray | B01D 45/16 55/339 |
| 2017/0008014 | A1 * | 1/2017 | Van Wolferen | A47L 9/1666 |
| 2017/0114720 | A1 * | 4/2017 | Stone | F02C 7/052 |
| 2019/0152581 | A1 * | 5/2019 | Davis | B64C 9/02 |
| 2019/0294755 | A1 * | 9/2019 | Colas | B64C 3/14 |
| 2019/0352024 | A1 * | 11/2019 | Todter | H01L 31/043 |
| 2020/0070950 | A1 * | 3/2020 | Narvaez Tijerina | B64C 3/14 |
| 2020/0239126 | A1 * | 7/2020 | Kafyeke | B64C 9/20 |
| 2020/0331602 | A1 * | 10/2020 | Mikic | B64C 11/18 |
| 2021/0004636 | A1 * | 1/2021 | Auxier | B22C 9/04 |
| 2021/0079885 | A1 * | 3/2021 | Arce | F03D 1/0683 |
| 2021/0215132 | A1 * | 7/2021 | Buravalla | F03D 1/0675 |
| 2022/0097821 | A1 * | 3/2022 | Elbaz | B64C 3/26 |
| 2022/0111403 | A1 * | 4/2022 | Koopmans | B04C 5/13 |
| 2023/0044023 | A1 * | 2/2023 | Van Der Kooi | B04C 5/13 |

FOREIGN PATENT DOCUMENTS

| | | |
|---|---|---|
| EP | 3027325 B1 | 3/2017 |
| JP | 2010-035904 A | 2/2010 |
| JP | 2016-533873 A | 11/2016 |
| WO | 2015150435 A1 | 10/2015 |

* cited by examiner

VORTEX FINDER FOR A CYCLONIC SEPARATOR

CROSS-REFERENCE TO RELATED APPLICATIONS

The present application is a U.S. National Phase application under 35 U.S.C. § 371 of International Application No. PCT/EP2020/087944, filed on Dec. 29, 2020, which claims the benefit of European Patent Application No. 20150969.2, filed on Jan. 9, 2020. This application is hereby incorporated by reference herein.

FIELD OF THE INVENTION

The invention relates to a vortex finder for a cyclonic separator, and to a vacuum cleaner comprising such a vortex finder.

BACKGROUND OF THE INVENTION

A bag-less vacuum cleaner uses a cyclone in order to separate the dirt particles from the air. A cyclone consists of a cylindrical chamber in which the air flow rotates fast. Centrifugal force generated by the circular air flow throws the dust particles towards the wall of the cyclone chamber from where they fall into a collection chamber. The cleaned air flows in an opposite direction through the center of the cyclone and is exhausted via the vortex finder to the outlet of the cyclone. The function of the vortex finder is to ensure a stable rotational flow to improve separation performance. The vortex finder usually has a plurality of vanes guiding the air towards the outlet.

US2012167336 discloses a vacuum cleaner with a separation module that comprises an exhaust grill positioned fluidly between a separator chamber and an air outlet. The exhaust grill can comprise a body having a plurality of louvers and a plurality of inlets defined between adjacent louvers. At least one of the louvers comprises an airfoil configured to deflect dirt away from at least one of the plurality of inlets. The leading end of a louver can include an airfoil tip that is configured to deflect dirt particles away from the gap. In an embodiment, the airfoil tip is formed by a curved guide surface formed on the upstream surface. The guide surface can be located at the outermost portion of the upstream surface. The guide surface can have a smaller radius of curvature toward the leading end as compared with the radius of curvature of the upstream surface toward the trailing end. The guide surface includes a transition point which defines the point at which the slope of a first tangent line on the side of the transition point closer to the leading end is less than the slope of a second tangent line on the side of the transition point closer to the trailing end, which results in a concave crescent shape on the upstream surface of the airfoil tip.

WO2015150435 discloses a vortex finder for a cyclonic separator through which air flowing in a helical path about an axis of a cyclone chamber passes to an outlet. The vortex finder comprises a plurality of stationary overlapping vanes extending in an axial direction and spaced radially around the axis, the vanes being positioned relative to each other so a helical flow of air about the axis of the cyclone chamber passes over an outer surface of the vanes with a portion of the air flow being redirected around a leading edge of each vane and through a gap between adjacent vanes to the outlet. At any point along the axis, a portion of an outer surface of each vane lies on a circle having its center coaxial with the axis, the outer surface of each vane having a portion leading towards the leading edge that extends inwardly away from the circle so that the leading edge of each vane about which air is redirected through the gap between vanes is located within a region bound by the circle to create a region of overpressure on the outer surface of the adjacent vane in the vicinity of the gap.

SUMMARY OF THE INVENTION

It is, inter alia, an object of the invention to provide an improved vortex finder. The invention is defined by the independent claims. Advantageous embodiments are defined in the dependent claims.

One aspect of the invention provides a vortex finder for a cyclonic separator, the vortex finder comprising a plurality of stationary vanes around which incoming air is guided into the vortex finder, in which a side of the vanes facing the incoming air is provided with a protrusion at a stagnation point. The protrusion may be shaped so as to guide the incoming air into the vortex finder, and may have a concave side following a shape of a neighboring vane, and a rounded top. Preferably, the protrusion has a height in a range between 70% and 130%, and more preferably in a range between 85% and 115%, of a gap width between the vanes. In another preferred embodiment, a gap width between adjacent vanes gradually increases from an outside to an inside of the vortex finder. A vacuum cleaner comprising a cyclonic separator preferably has such a vortex finder.

To a large extent, embodiments of the present invention are similar to those of WO2015150435, incorporated herein by reference. A major difference is formed by the shape of the vanes of the vortex finder.

These and other aspects of the invention will be apparent from and elucidated with reference to the embodiments described hereinafter.

DESCRIPTION OF EMBODIMENTS

Figure 1:
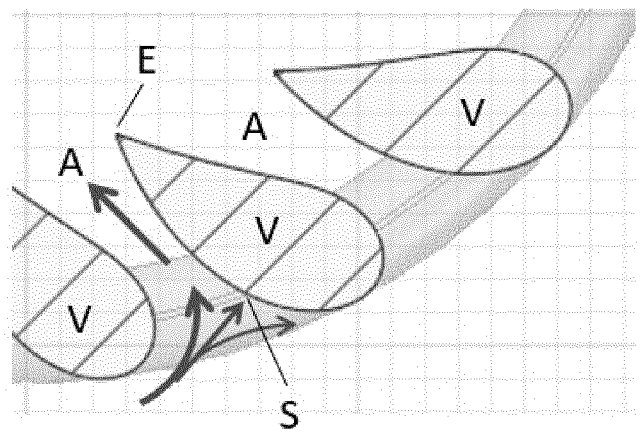
FIG. 1 shows an airflow as happens with vanes covered by our non-prepublished copending application EP 19158400.2.

FIG. 1 shows an airflow as happens with vanes covered by our non-prepublished copending application EP 19158400.2. While most of the air flow enters into the vortex finder F as a result of suction by the motor-fan aggregate of the vacuum cleaner (not shown), in reality, some of the air flow bumps into the vane V, and another part goes around the vane V. Where the air bumps into the vane V, dirt will be accumulated. The place where the air bumps into the vane V, is called the stagnation point S, which is usually defined (see e.g. Wikipedia) as a point in a flow field where the local velocity of the fluid is zero. Stagnation points exist at the surface of objects in the flow field, where the fluid is brought to rest by the object.

In accordance with preferred embodiments of the invention, a side of the vanes V facing the incoming air A is provided with a protrusion P at the stagnation point S, to thereby prevent dirt from accumulating on the vanes V at the stagnation points S. By doing so, the pollution can be significantly reduced, without influencing the separation performance or pressure loss.

It is noted that while the protrusions P are described here in the context of vanes V having only one sharp edge E where air separates from the vane V inside of the vortex finder F, covered by our non-prepublished copending application EP 19158400.2, the problem of dirt accumulation at stagnation points where air bumps into the vanes of the vortex finder, and the solution of providing the sides of the vanes with protrusions, is not limited to such vanes, and may equally happen with different vanes (e.g. those described in US2012167336 or WO2015150435), which will likewise benefit from protrusions to prevent dirt accumulation from happening.

It is important that the protrusions P are positioned as close as possible to the stagnation points S. FIG. 12b of WO 2015150435 shows outer trailing end edges 45 resulting from cutting a part out of vanes 41. However, that solution will not help to prevent dirt from accumulating inside the hollow parts at the trailing end faces 42 in which the stagnation points are located. So, in this prior art solution, at the stagnation points, there are no protrusions that prevent dirt from accumulation at the stagnation points, but hollow shapes that collect dirt.

Figure 2A:
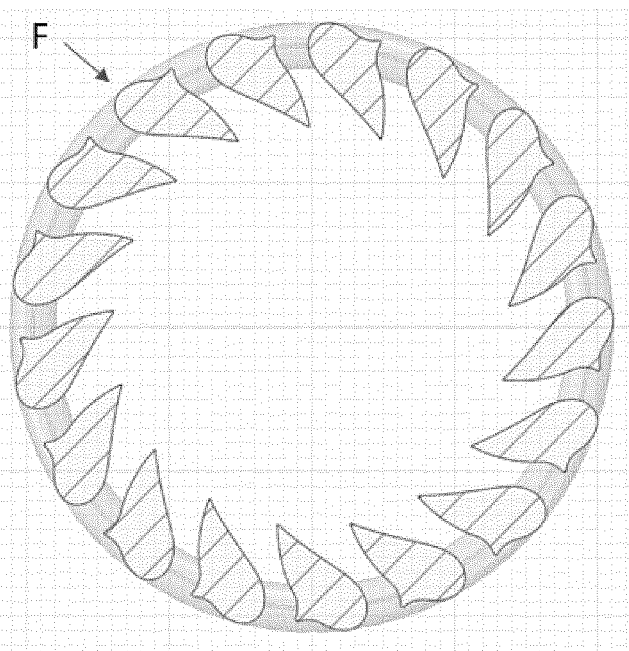
FIGS. 2A-4B illustrate embodiments of a vortex finder in accordance with the present invention.
Figure 2B:
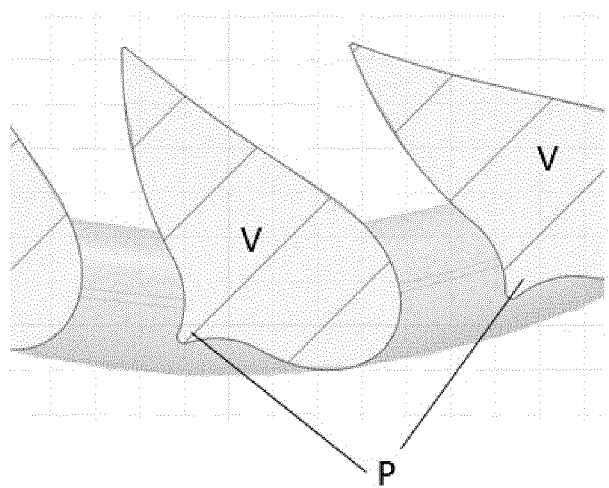

FIGS. 2A and 2B show a first embodiment of vanes V provided with protrusions P to prevent dirt from accumulating. Here, both sides of the protrusions P are concave.

Figure 3A:
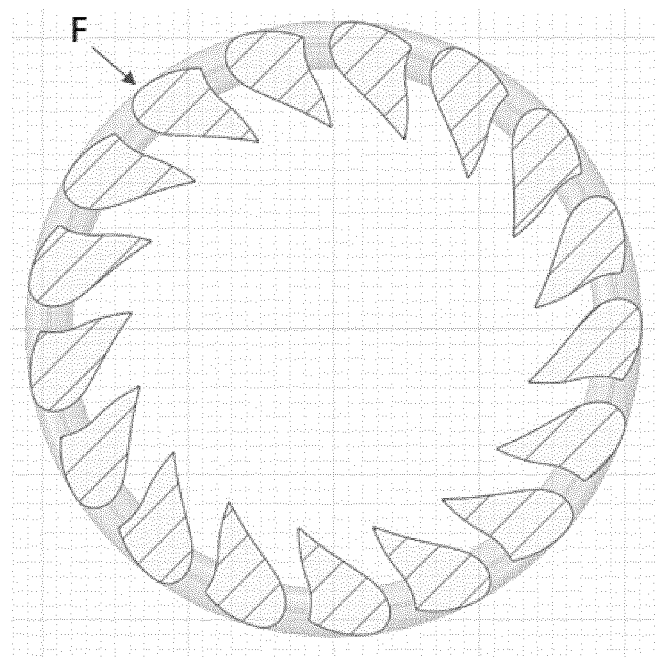
Figure 3B:
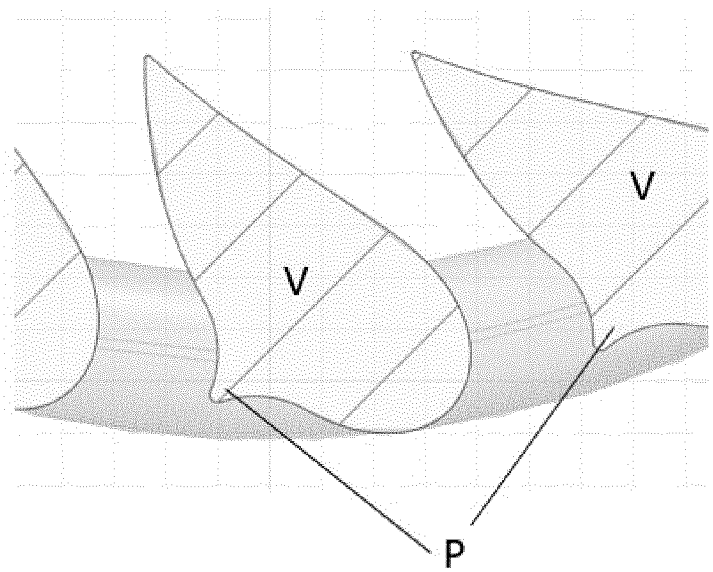

FIGS. 3A and 3B show a second embodiment of vanes V provided with protrusions P to prevent dirt from accumulating. Here, the sides of the protrusions P facing into the vortex finder F are concave, and the sides of the protrusions P facing the outside of the vortex finder F are convex.

The concave shapes of FIGS. 2A-3B serve to ensure that the protrusions P are shaped so as to guide the incoming air A relatively smoothly into the vortex finder F.

The protrusions P preferably have a rounded top, which is more forgiving as regards manufacturing tolerances than a sharp top. However, a sharp top is possible.

In a practical embodiment, the vanes are separated by gaps having a gap width of about 1.75 mm; with a different gap width, the size of the other dimensions discussed below needs to be scaled accordingly.

In the embodiment of FIGS. 2A and 2B, the design goal that the protrusions P are positioned as close as possible to the stagnation points S means that the protrusions P preferably deviate by less than 1 mm from the stagnation points S. The diameter of any rounded tops of the protrusions P is preferably in a range between 0.25 mm and 0.35 mm, such as about 0.3 mm. Compared to the basic shape of the vanes as shown in FIGS. 1-4, the height of the protrusions P is preferably in a range between 0.75 mm and 1.25 mm, such as about 1 mm. The footprint of the protrusions P is preferably in a range between 2.5 mm and 3.5 mm, such as about 3 mm.

In the embodiment of FIGS. 3A and 3B, the concave sides of the protrusions P are preferably shaped in such a way that a gap width between adjacent vanes V is substantially constant, i.e. these concave sides follow the shape of the neighboring vanes. Compared to the basic shape of the vanes as shown in FIGS. 1-4, the height of the protrusions P is preferably in a range between 1.25 mm (70% of the gap width of 1.75 mm) and 2.25 mm (130% of 1.75 mm), and more preferably in a range between 1.5 mm (85% of 1.75 mm) and 2.0 mm (115% of 1.75 mm), such as about 1.75 mm, which most nicely results in the protrusions P being located at the stagnation points S. The concave sides of the protrusions P are preferably shaped in such a way that there is a continuous curve from the basic shape of the vane towards the tops of the protrusions P. The diameter of any rounded tops of the protrusions P is preferably in a range between 0.15 mm and 0.25 mm, such as about 0.2 mm.

Figure 4A:
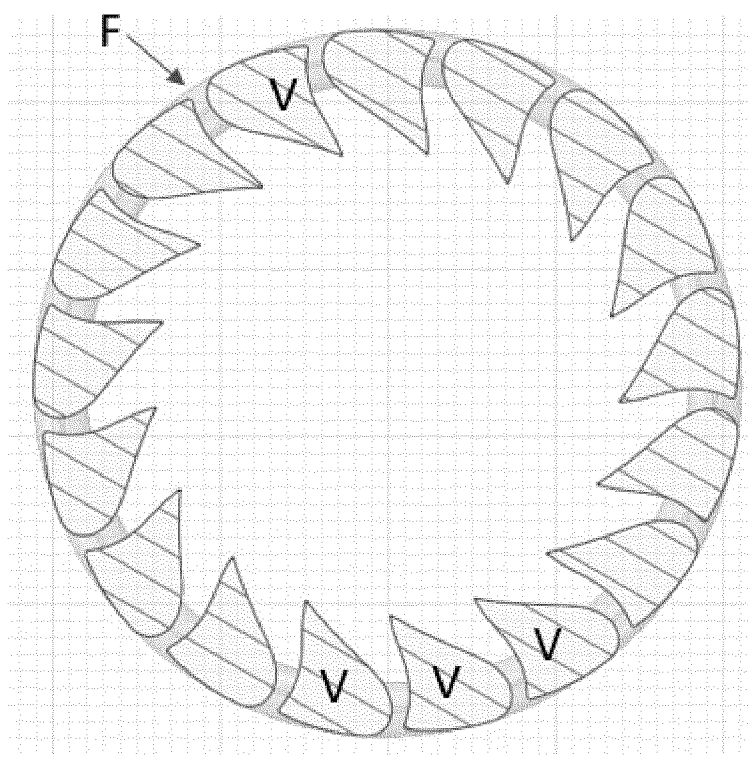
Figure 4B:
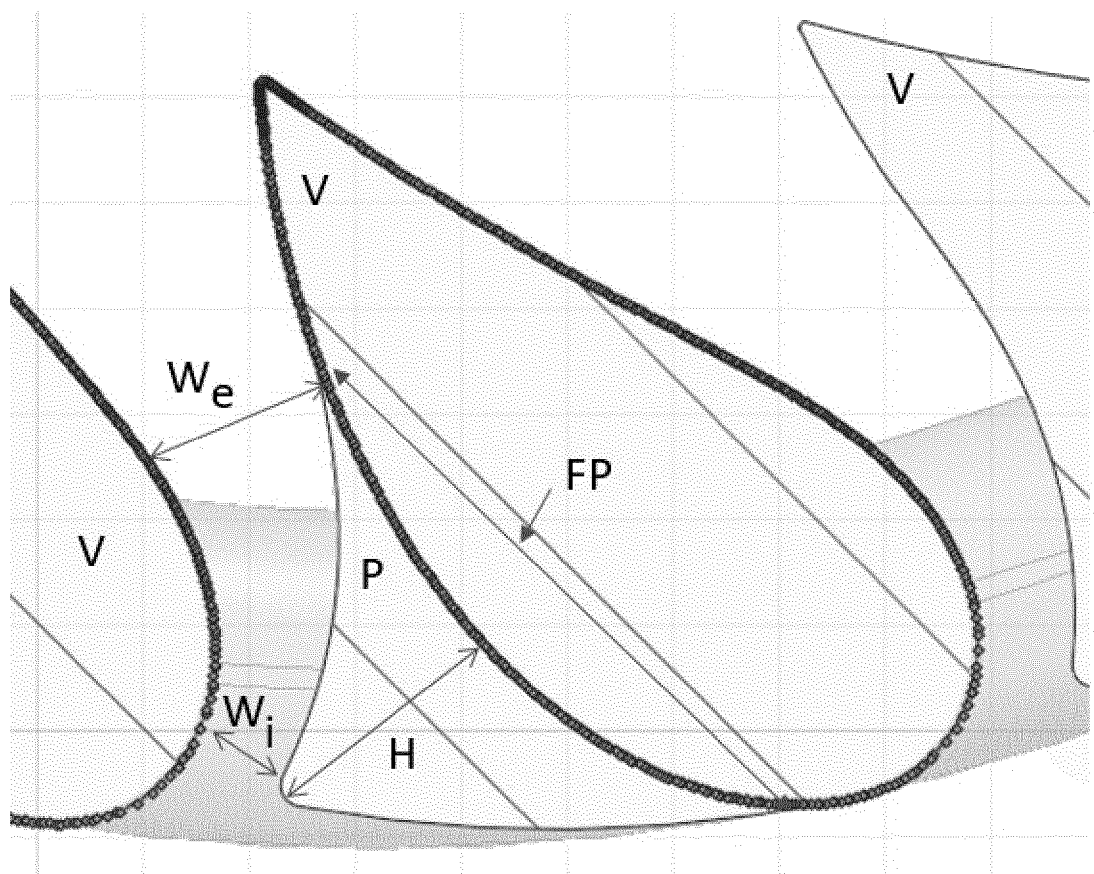

In the embodiments of FIGS. 4A and 4B, the protrusions P are shaped such that the gap width between adjacent vanes V increases from the outside towards the inside of the vortex finder F. The gap width increase is preferably gradually and/or continuously. As a result, the gap obtains a diffuser-like shape. Diffusers are known from e.g. I.E. Idel'chik—Handbook of hydraulic resistance (1960). The gap width increase (here between curved shapes of neighboring vanes V) is preferably comparable to a gap width increase between flat plates positioned at an angle of between 5° and 30°, and more preferably about 12°. In one example, the gap has an initial width $W_i$ of 0.9 mm, and, beyond the protrusion P, an end width $W_e$ of 1.75 mm. The protrusion P has a rounded top, a height of 2.3 mm, and a footprint FP of 7 mm.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The claimed feature that the vanes V have a protrusion P at a stagnation point S does not mean that the protrusion P must be exactly at the stagnation point S, but merely that the protrusions P are positioned close to the stagnation points S. Measures recited in mutually different dependent claims may advantageously be used in combination.

The invention claimed is:

1. A vortex finder for a cyclonic separator, the vortex finder comprising:
   a plurality of stationary vanes around which incoming air is guided into the vortex finder, wherein a side of the plurality of stationary vanes facing the incoming air is provided with a protrusion at a stagnation point, wherein sides of the protrusion facing outside of the vortex finder are convex, wherein sides of the protrusion facing into the vortex finder are concave, and wherein the stationary vanes are in a shape of an airfoil, each stationary vane having a tip extending toward a center of the vortex finder.

2. The vortex finder of claim 1, wherein the protrusion is shaped so as to guide the incoming air into the vortex finder.

3. The vortex finder of claim 1, wherein the protrusion has a concave side following a shape of a neighboring vane.

4. The vortex finder of claim 1, wherein the protrusion has a rounded top.

5. The vortex finder of claim 1, wherein the protrusion has a height in a range between 70% and 130% of a gap width between the plurality of stationary vanes.

6. The vortex finder of claim 5, wherein the protrusion has the height in a range between 85% and 115% of the gap width between the plurality of stationary vanes.

7. The vortex finder of claim 1, wherein a gap width between adjacent vanes of the plurality of stationary vanes increases from an outside to an inside of the vortex finder.

8. The vortex finder of claim 1, wherein a vacuum cleaner comprising a cyclonic separator includes the vortex finder.

9. The vortex finder of claim 1, wherein the concave sides of the protrusions are shaped such that there is a continuous curve from basic shape of a vane of the plurality of stationary vanes towards top of the protrusion.

* * * * *